US012500322B2

(12) United States Patent
Niu et al.

(10) Patent No.: US 12,500,322 B2
(45) Date of Patent: Dec. 16, 2025

(54) FILTER STRUCTURE AND FILTER DEVICE

(71) Applicant: ANHUI ANUKI TECHNOLOGIES CO., LTD., Anhui (CN)

(72) Inventors: Jian Niu, Anhui (CN); Chengjie Zuo, Anhui (CN); Jun He, Anhui (CN)

(73) Assignee: ANHUI ANUKI TECHNOLOGIES CO., LTD., Hefei (CN)

( * ) Notice: Subject to any disclaimer, the term of this patent is extended or adjusted under 35 U.S.C. 154(b) by 585 days.

(21) Appl. No.: 17/919,247

(22) PCT Filed: Apr. 2, 2021

(86) PCT No.: PCT/CN2021/085213

§ 371 (c)(1),
(2) Date: Oct. 14, 2022

(87) PCT Pub. No.: WO2021/208761

PCT Pub. Date: Oct. 21, 2021

(65) Prior Publication Data

US 2023/0187799 A1 Jun. 15, 2023

(30) Foreign Application Priority Data

Apr. 17, 2020 (CN) ......................... 202010306011.8

(51) Int. Cl.

*H01P 1/205* (2006.01)
*H01P 1/207* (2006.01)
*H01P 7/06* (2006.01)

(52) U.S. Cl.

CPC ............ *H01P 1/207* (2013.01); *H01P 1/2053* (2013.01); *H01P 7/06* (2013.01)

(58) Field of Classification Search

CPC .. H01P 1/20; H01P 1/202; H01P 1/205; H01P 1/2053; H01P 1/207; H01P 1/208; H01P 1/2133

See application file for complete search history.

(56) References Cited

U.S. PATENT DOCUMENTS 3,516,030 A * 6/1970 Brumbelow .......... H01P 1/2053 333/226
4,464,640 A 8/1984 Nishikawa et al.
(Continued)

FOREIGN PATENT DOCUMENTS

CN 1605154 A 4/2005
CN 201181730 Y 1/2009
(Continued)

OTHER PUBLICATIONS

International Search Report issued in related PCT Application No. PCT/CN2021/085213, mailed on Jun. 29, 2021, in 2 pages.
(Continued)

*Primary Examiner* — Stephen E. Jones

(74) *Attorney, Agent, or Firm* — Davis Wright Tremaine LLP

(57) ABSTRACT

A filter structure and a filter device provided by the present application relate to the technical field of electronic devices. The filter structure includes: a shielding component, which includes a first shielding layer and a second shielding layer, which are arranged opposite each other at an interval; at least two resonance components, which are arranged at an interval, wherein each resonance component includes a resonance column and a resonance disk connected to the resonance column, and the resonance column is located between the first shielding layer and the second shielding layer and is connected to the first shielding layer; and a coupling enhancement component, which is respectively arranged at intervals from the first shielding layer and the second shielding layer, and is respectively connected to at least two resonance columns, so as to increase a coupling coefficient between the at least two resonance columns.

10 Claims, 10 Drawing Sheets

(56) References Cited

U.S. PATENT DOCUMENTS

| | | | | |
|---|---|---|---|---|
| 6,366,184 | B1 | 4/2002 | Ohtonen | |
| 2010/0265015 | A1* | 10/2010 | Hoeft | H01P 7/08 333/219.1 |
| 2017/0346148 | A1 | 11/2017 | Tamiazzo et al. | |
| 2018/0131063 | A1 | 5/2018 | Zhu et al. | |
| 2018/0277918 | A1* | 9/2018 | Kim | H01P 5/024 |
| 2018/0301781 | A1 | 10/2018 | Peng et al. | |
| 2019/0198959 | A1 | 6/2019 | Ashida et al. | |

FOREIGN PATENT DOCUMENTS

| | | | |
|---|---|---|---|
| CN | 101276952 | B | 8/2012 |
| CN | 102868009 | A | 1/2013 |
| CN | 103378388 | A | 10/2013 |
| CN | 105576329 | A | 5/2016 |
| CN | 107359394 | A | 11/2017 |
| CN | 111403868 | A | 7/2020 |
| CN | 211605368 | U | 9/2020 |
| JP | S58194405 | A | 11/1983 |
| JP | H06291512 | A | 10/1994 |
| JP | 2011507312 | A | 3/2011 |
| JP | 2013225787 | A | 10/2013 |
| JP | 2018535617 | A | 11/2018 |
| WO | 2019033268 | | 2/2019 |

OTHER PUBLICATIONS

Japan Patent Office, "Office Action" in Application No. 2022-563004, Oct. 6, 2023, 20 pages.

The State Intellectual Property Office of People's Republic of China, "First Office Action", in Application No. 20201030611.8, Oct. 16, 2024, 21 pages.

European Patent Office, "Search Report" in Application No. 21 787 857.8-1205, Sep. 20, 2023, 5 pages.

European Patent Office, "Search Report" in Application No. 21 787 857.8-1201, Nov. 12, 2024, 7 pages.

European Patent Office, "Search Report" in Application No. 21 787 857.8-1205, Sep. 8, 2023, 4 pages.

* cited by examiner

FILTER STRUCTURE AND FILTER DEVICE

CROSS-REFERENCE TO RELATED APPLICATIONS

The present disclosure is a 371 U.S. National Phase of International Patent Application No. PCT/CN2021/085213, filed Apr. 2, 2021, entitled "FILTER STRUCTURE AND FILTER DEVICE," which claims priority to Chinese Patent Application No. 202010306011.8, filed Apr. 17, 2020, entitled "FILTER STRUCTURE AND FILTER DEVICE," the contents of which are incorporated herein by reference in their entirety.

TECHNICAL FIELD

The present disclosure relates to the technical field of electronic devices, and in particular, to a filter structure and a filter device.

BACKGROUND ART

In the technical field of electronic device, miniaturization processing is particularly important in the process of device integration. In the above, a filter device is generally composed of a filter structure, so that the volume of the filter structure determines the volume of the filter device. However, based on the existing manufacturing process of the filter structure, in the process of integration of the filter device, if the requirements for miniaturization are to be met, the bandwidth of the passband of the device will be limited, and is difficult to be widened effectively.

SUMMARY

In view of this, the present disclosure provides a filter structure and a filter device to solve the problem on how to simultaneously realize integration and effectively widen the bandwidth of the passband of a device in a filter device.

The embodiments of the present disclosure use the following technical solutions.

A filter structure, which comprises:

a shielding component, wherein the shielding component comprises a first shielding layer and a second shielding layer, the first shielding layer and the second shielding layer are provided opposite to each other at an interval;

at least two resonance components, wherein at least two resonance components are provided at an interval, each of the resonance components comprises a resonance column and a resonance disk connected to the resonance column, and the resonance column is located between the first shielding layer and the second shielding layer and is connected to the first shielding layer; and a coupling enhancement component, wherein the coupling enhancement component is respectively spaced apart from the first shielding layer and the second shielding layer, and is respectively connected to at least two resonance columns, so as to increase a coupling coefficient between the at least two resonance columns.

Optionally, in the above-mentioned filter structure, the coupling enhancement component comprises at least one coupling connecting piece, wherein each of the coupling connecting pieces is respectively connected with two resonance columns, so as to improve an electromagnetic coupling coefficient between the two resonance columns.

Optionally, in the above-mentioned filter structure, in a propagation direction of a to-be-processed signal between the resonance components, each of the coupling connecting pieces is respectively connected to two adjacent resonance columns, so as to improve the electromagnetic coupling coefficient between two adjacent resonance columns.

Optionally, in the above-mentioned filter structure, in the propagation direction of the to-be-processed signal between the resonance components, in the at least one coupling connecting piece, at least one coupling connecting piece is respectively connected with two non-adjacent resonance columns, so as to improve the electromagnetic coupling coefficient between the two non-adjacent resonance columns, and form a transmission zero at a position outside a passband of the filter structure and close to an upper cut-off frequency.

Optionally, in the above-mentioned filter structure, the coupling enhancement component comprises at least one group of coupling connecting pieces, and each group of coupling connecting pieces comprises two coupling connecting pieces, wherein the two coupling connecting pieces belonging to same group are respectively connected to two resonance columns, and the two coupling connecting pieces are provided at an interval in a staggered manner to form a capacitive component, thereby improving a capacitive coupling coefficient between the two resonance columns.

Optionally, in the above-mentioned filter structure, in the propagation direction of the to-be-processed signal between the resonance components, two coupling connecting pieces belonging to the same group are respectively connected to two adjacent resonance columns, so as to improve the capacitive coupling coefficient between the two adjacent resonance columns.

Optionally, in the above-mentioned filter structure, in the propagation direction of the to-be-processed signal between the resonance components, there are two coupling connecting pieces of at least one group of coupling connecting pieces, which are respectively connected to two non-adjacent resonance columns, so as to improve the capacitive coupling coefficient between the two non-adjacent resonance columns, and form a transmission zero at a position outside the passband of the filter structure and close to a lower cut-off frequency.

Optionally, in the above-mentioned filter structure, two coupling connecting pieces belonging to the same group are provided in parallel, and projections of staggered parts of the two coupling connecting pieces in a direction perpendicular to extension direction of the two coupling connecting pieces are coincided.

Optionally, in the above-mentioned filter structure, the coupling enhancement component is in a metal structure.

Optionally, in the above-mentioned filter structure, the first shielding layer and the second shielding layer are patterned conductive structures formed on other non-conductive structures.

Optionally, in the above-mentioned filter structure, the shielding component further comprises a plurality of shielding columns, and the plurality of the shielding columns are provided at intervals between the first shielding layer and the second shielding layer to form a cavity structure, and the resonance component and the coupling enhancement component are located inside the cavity structure.

Optionally, in the above-mentioned filter structure, the shielding component further comprises a plurality of other shielding layers provided between the first shielding layer and the second shielding layer and forming a closed cavity structure together with the first shielding layer and the second shielding layer, and the resonance component and the coupling enhancement component are located inside the cavity structure.

Optionally, in the above-mentioned filter structure, a plurality of cavity sub-structures are formed inside the cavity structure, so as to respectively arrange the resonance components, and a shielding opening for transmitting the to-be-processed signal between the resonance components is formed between the cavity sub-structures.

Optionally, in the above-mentioned filter structure, opposite surfaces of the first shielding layer and the second shielding layer are quadrilaterals, and there are four other shielding layers.

On the basis of the above, embodiments of the present disclosure also provide a filter device, which comprises:

a connection port, wherein the connection port comprises a first port and a second port; and the above-mentioned filter structure, wherein a plurality of the filter structures are provided, and the plurality of the filter structures are respectively connected between the first port and the second port, so as to perform filtering processing on the to-be-processed signal input through the first port and then output through the second port, or perform filtering processing on the to-be-processed signal input through the second port and then output through the first port.

Figure 1:
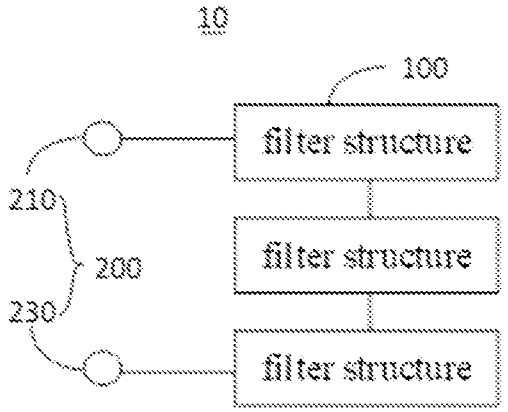
FIG. 1 is a structural block diagram of a filter device provided by an embodiment of the present disclosure.

Reference numerals: 10—filter device; 100—filter structure; 110—shielding component; 111—first shielding layer; 113—second shielding layer; 115—shielding column; 120—resonance component; 121—resonance column; 123—resonance disk; 130—coupling enhancement component; 131—coupling connecting piece; 200—connection port; 210—first port; 230—second port.

DETAILED DESCRIPTION OF EMBODIMENTS

In order to make the purpose, technical solutions and advantages of the embodiments of the present disclosure clearer, the technical solutions in the embodiments of the present disclosure will be described clearly and completely below in conjunction with the drawings in the embodiments of the present disclosure, obviously, the described embodiments are only a part of the embodiments of the present disclosure, but not all of the embodiments. The components of the embodiments of the present disclosure generally described and shown in the drawings herein may be arranged and designed in various different configurations.

Therefore, the following detailed description of the embodiments of the present disclosure provided in the drawings is not intended to limit the claimed scope of the present disclosure, but merely represents selected embodiments of the present disclosure. Based on the embodiments in the present disclosure, all other embodiments obtained by those ordinarily skilled in the art, without making inventive effort, fall within the protection scope of the present disclosure.

As shown in FIG. 1, an embodiment of the present disclosure provides a filter device 10, wherein the filter device 10 may include a connection port 200 and a filter structure 100.

In detail, the connection port 200 may include a first port 210 and a second port 230, and there may be a plurality of filter structures 100. In this way, the plurality of filter structures 100 may be respectively connected between the first port 210 and the second port 230, and are used to perform filtering processing on the to-be-processed signal input through the first port 210 and then output through the second port 230 (that is, the first port 210 is used as an input port, and the second port 230 is used as an output port), or perform filtering processing on the to-be-processed signal input through the second port 230 and then output through the first port 210 (that is, the first port 210 is used as an output port, and the second port 230 is used as an input port).

In the above, the number of connection ports 200 is not limited. For example, on the basis of including the first port 210 and the second port 230, it may also include a third port, and a fourth port, etc., which can be provided according to actual application requirements.

Moreover, the connection relationship between the multiple filter structures 100 is also not limited, and can be selected according to actual application requirements.

For example, in an optional example, multiple filter structures 100 may be connected in series. For another example, in another optional example, multiple filter structures 100 may also be connected in parallel. For another example, in another optional example, multiple filter structures 100 may also be in hybrid connection (that is, series connection and parallel connection are both included).

It should be noted that the specific type of the filter device 10 is not limited, and can be selected according to actual application requirements, for example, it can be a millimeter wave filter.

Figure 2:
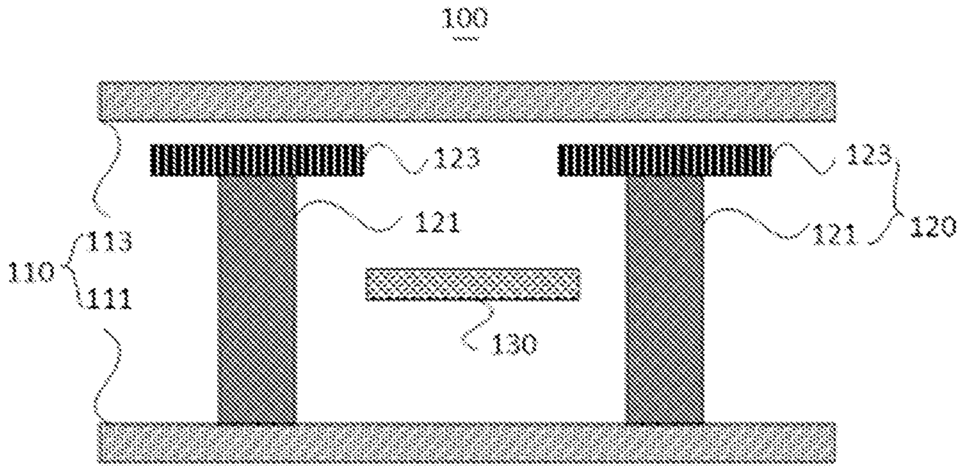
FIG. 2 is a structural schematic view of a filter structure provided by an embodiment of the present disclosure.

With reference to FIG. 2, embodiments of the present disclosure further provide a filter structure 100 that can be applied to the above-mentioned filter device 10, wherein the filter structure 100 may include a shielding component 110, a resonance component 120 and a coupling enhancement component 130.

In detail, the shielding component 110 may include a first shielding layer 111 and a second shielding layer 113, wherein the first shielding layer 111 and the second shielding layer 113 are provided opposite to each other at an interval. There may be at least two resonance components 120, and resonance components 120 may be provided at intervals. Each of resonance components 120 may include a resonance column 121 and a resonance disk 123 connected with the resonance column 121, the resonance column 121 is located between the first shielding layer 111 and the second shielding layer 113 and connected with the first shielding layer 111. The coupling enhancement component 130 may be respectively spaced apart from the first shielding layer 111 and the second shielding layer 113, and is respectively connected to at least two resonance columns 121, so as to increase a coupling coefficient between the at least two resonance columns 121.

Based on this, on the one hand, the arrangement of the coupling enhancement component 130 will not lead to an increase in the volume of the filter structure 100, and on the other hand, due to the arrangement of the coupling enhancement component 130, the coupling coefficient between the connected resonance columns 121 can also be improved, so that the bandwidth of the passband of the filter structure 100 may be increased, thereby solving the problem of simultaneously realizing integration and effectively widening the bandwidth of the passband of the device.

For the shielding component 110, it should be noted that the specific structure of the shielding component 110 (e.g., the first shielding layer 111, the second shielding layer 113, and other structures included) is not limited, and can be selected according to actual application requirements.

For example, in an optional example, the first shielding layer 111 and the second shielding layer 113 included in the shielding component 110 may be provided to be slightly inclined with each other, that is, may be provided in non-parallel. For another example, in another optional example, the first shielding layer 111 and the second shielding layer 113 may also be provided in parallel.

In the above, the specific structures of the first shielding layer 111 and the second shielding layer 113 are also not limited, and can be selected according to actual application requirements.

For example, in an optional example, the first shielding layer 111 and the second shielding layer 113 may be in metal layered structure. For another example, in another optional example, the first shielding layer 111 and the second shielding layer 113 may also be in non-metallic shielding structure with electromagnetic shielding effect.

Furthermore, the first shielding layer 111 and the second shielding layer 113 may be patterned conductive structures formed on other non-conductive structures (that is, only the patterned conductive structures have an electromagnetic shielding effect), or may be layered conductive structures (that is, all the layered conductive structures have the electromagnetic shielding effect).

It can be understood that the shielding component 110 may also include other shielding structures on the basis of including the first shielding layer 111 and the second shielding layer 113. In this way, the shielding structure composed of the first shielding layer 111, the second shielding layer 113 and other shielding structures may be formed as a cavity, so that the resonance component 120 and the coupling enhancement component 130 may be located inside the cavity of the shielding structure, thereby realizing isolation from external interference signals.

Optionally, the specific compositions of the above-mentioned other shielding structures for constituting the cavity are also not limited, and can be selected according to actual application requirements.

Figure 3:
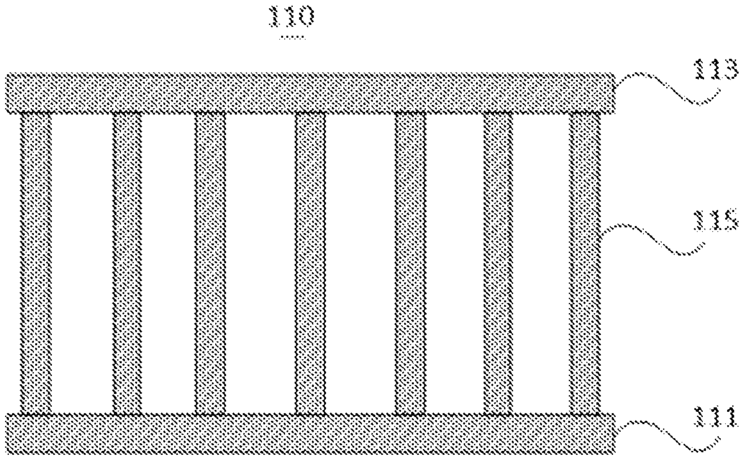
FIG. 3 is a structural schematic view of a shielding component provided by an embodiment of the present disclosure.

For example, in an optional example, referring to FIG. 3, in order that the first shielding layer 111, the second shielding layer 113 and other shielding structures included in the shielding component 110 may form a non-closed cavity, the shielding component 110 may further comprise a plurality of shielding columns 115, that is, the plurality of shielding columns 115 may be used as the aforementioned other shielding structures.

In the above, the plurality of shielding columns 115 may be provided between the first shielding layer 111 and the second shielding layer 113 at intervals to form an accommodation space (that is, the above-mentioned cavity), which is used to perform the electromagnetic shielding on the resonance component 120 and the coupling enhancement component 130 located in the accommodating space.

For another example, in another optional example, in order that the first shielding layer 111, the second shielding layer 113 and other shielding structures included in the shielding component 110 may form a closed cavity, the shielding component 110 may also include other shielding layers, that is, the other shielding layer can be used as the aforementioned other shielding structures.

In the above, in a specific application example, the opposite surfaces of the first shielding layer 111 and the second shielding layer 113 are quadrilaterals (such as rectangles or squares), and four other shielding layers are used, so that the first shielding layer 111, the second shielding layer 113 and the four other shielding layers can form a closed accommodation space (that is, the above-mentioned cavity), so as to arrange the resonance component 120 and the coupling enhancement component 130 in the accommodation space.

It can be understood that, in the above example, the opposite surfaces of the first shielding layer 111 and the second shielding layer 113 are quadrilaterals, which is only an exemplary illustration. In other examples, based on different application requirements, they may also be triangles, pentagons, hexagons, etc.

In addition, the specific composition of the shielding column 115 or other shielding layer as the above-mentioned other shielding structure is not limited, and can be selected according to actual application requirements, for example, it can also be a metal shielding layer or a metal shielding column (or a non-metallic shielding layer, or a non-metallic shielding column).

What needs to be further explained about the shielding component 110 is that since there are at least two resonance components 120, in order to enable the to-be-processed signal to be filtering processed orderly through the resonance components 120 in sequence, in this embodiment, on the basis of the cavity structure formed by the first shielding layer 111, the second shielding layer 113 and other shielding structures, at least two cavity sub-structures may also be respectively formed inside the cavity structure, so as to respectively arrange the resonance components 120.

In the above, in order to transmit the to-be-processed signal between the at least two resonance components 120 in sequence, a certain shielding opening may be formed between the above-mentioned cavity sub-structures, so that the to-be-processed signal processed by the resonance component 120 in the former cavity sub-structure may be transmitted into the latter cavity structure through the shielding opening and be processed by the resonance component 120 again.

Figure 4:
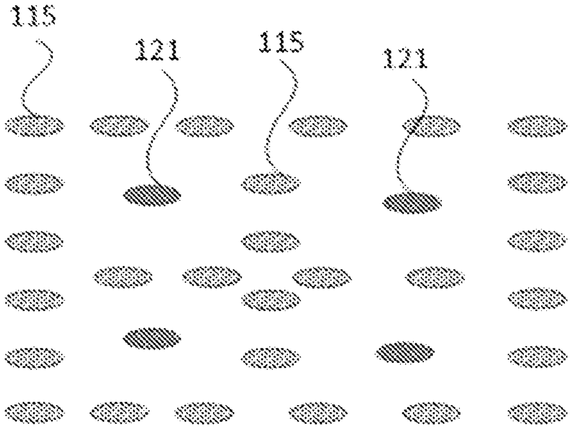
FIG. 4 is a schematic view of a positional distribution relationship between a cavity structure formed by shielding columns and resonance columns provided by an embodiment of the present disclosure.

Optionally, the specific formation method of the cavity sub-structure is not limited, and may be selected according to actual application requirements. For example, in an optional example, the shielding layer as the above-mentioned other shielding structure may be used. In another optional example, the shielding column 115 (as shown in FIG. 4) as above-mentioned other shielding structure can also be used.

Based on the above arrangement, in the at least two cavity sub-structures formed inside the above-mentioned cavity structure, in order to form the above-mentioned shielding opening, the corresponding cavity sub-structure also needs to be processed, for example, when the cavity sub-structure is formed by enclosing a plurality of cavity shielding columns 115, a shielding opening can be formed by setting the positional relationship of the cavity shielding columns 115, so that the to-be-processed signal can be transmitted through the shielding opening.

It can be understood that the positional relationship of the cavity shielding column 115 is not limited, and can be set according to actual application requirements, which is not specifically limited here.

Moreover, between the first shielding layer 111 and the second shielding layer 113 (as in the above-mentioned example, in the accommodation space formed by the cavity structure), a dielectric material may also be filled.

In the above, the specific type of the above-mentioned dielectric material is not limited, and can be selected according to actual application requirements. For example, it may include but are not limited to dielectrics with a dielectric constant of 3.0, 3.5, or 4.0.

It should be noted for the resonance components 120 that the specific number of the resonance components 120 is not limited, and can be selected according to actual application requirements, as long as there are at least two.

For example, in an optional example, two resonance components 120 are provided, that is, two resonance columns 121 and two resonance disks 123 are included. For another example, in another optional example, three resonance components 120 are provided, that is, three resonance columns 121 and three resonance disks 123 are included. For another example, in another optional example, four resonance components 120 are provided, that is, four resonance columns 121 and four resonance disks 123 are included.

Moreover, the specific structure of the resonance component 120 (e.g., the connection relationship between the resonance column 121 and the resonance disk 123) is also not limited, and can be selected according to actual application requirements.

Figure 5:
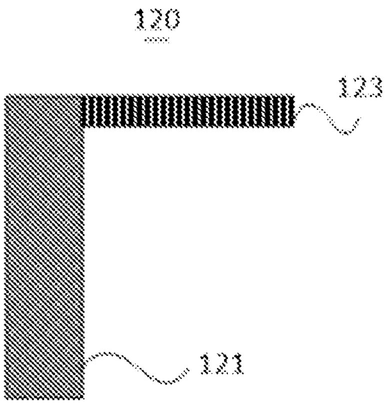
FIG. 5 is a structural schematic view of a resonance component provided by an embodiment of the present disclosure.

For example, in an optional example, as shown in FIG. 5, the resonance column 121 and the resonance disk 123 included in the resonance component 120 may be connected by side faces. For another example, in another optional example, as shown in FIG. 2, the resonance column 121 and the resonance disk 123 may also be connected by end faces, as long as it can ensure effective electrical connection between the resonance column 121 and the resonance disk 123.

In the above, when the resonance column 121 and the resonance disk 123 are connected through the end faces, based on different requirements, the resonance column 121 can penetrate through the resonance disk 123, that is, the resonance column 121 can extend to one face of the resonance disk 123 close to the second shielding layer 113 (or penetrate through that face). The resonance column 121 may also only extend to one face of the resonance disk 123 away from the second shielding layer 113.

Optionally, the relative positional relationship between the resonance column 121 and the resonance disk 123 is also not limited, and can be selected according to actual application requirements.

For example, in an optional example, the resonance column 121 and the resonance disk 123 are provided non-vertically, that is, anon-zero included angle may be provided between individual end faces. For another example, in another optional example, the resonance column 121 and the resonance disk 123 may also be provided vertically, that is, the end faces may be parallel to each other.

Optionally, the specific compositions of the resonance column 121 and the resonance disk 123 are also not limited, and can be selected according to actual application requirements.

For example, in an optional example, the resonance column 121 and the resonance disk 123 may be a non-metallic conductive column and a non-metallic conductive disk, respectively. For another example, in another optional example, the resonance column 121 and the resonance disk 123 may be a metal column and a metal disk, respectively.

In the above, the specific shape of the non-metallic conductive column or the metal column is also not limited, and can also be selected according to actual application requirements. For example, it may include but is not limited to non-metallic conductive cylinder, metal cylinder, non-metallic conductive square column or metal square column or other regular or irregular columnar structures.

In addition, the specific shape of the non-metallic conductive disk or metal disk is not limited, for example, it may include but is not limited to non-metallic conductive circular disk, metal circular disk, non-metal conductive square disk or metal square disk or other regular or irregular disk-like structure.

Optionally, the relative positional relationship between the resonance column 121 and the first shielding layer 111 is also not limited, and can be selected according to actual application requirements.

For example, in an optional example, the resonance column 121 and the first shielding layer 111 may be provided non-vertically.

For another example, in another optional example, the resonance column 121 and the first shielding layer 111 may also be provided vertically, that is, one end of the resonance column 121 is provided on the first shielding layer 111, and the other end extends in a direction perpendicular to the first shielding layer 111.

In the above, when the resonance column 121 is perpendicular to the resonance disk 123 (that is, the first shielding layer 111 and the resonance disk 123 are provided in parallel), the resonance column 121 also extends in a direction perpendicular to the resonance disk 123.

It can be understood that, in the above example, for each of resonance columns 121, based on a certain manufacturing process, the projections of the resonance column 121 and the resonance disk 123 in the extending direction of the resonance column 121 may completely be coincided, or may be partially coincided, as long as it can be ensured that the resonance column 121 is connected to the resonance disk 123.

It should be noted for the coupling enhancement component 130 that the specific composition of the coupling enhancement component 130 is not limited, and may be selected according to actual application requirements. For example, it may have different compositions based on different actual coupling effects.

For example, in an optional example, in order to make the frequency value of the passband of the filter structure 100 larger as a whole, the coupling enhancement component 130 may be configured to enhance the electromagnetic coupling coefficient between the resonance columns 121.

For another example, in another optional example, in order to make the frequency value of the passband of the filter structure 100 smaller as a whole, the coupling enhancement component 130 may be configured to enhance the capacitive coupling coefficient between the resonance columns 121.

Figure 6:
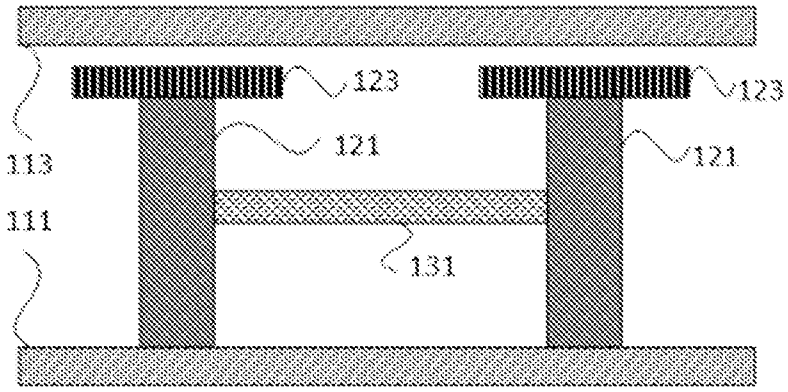
FIG. 6 is a structural schematic view of a filter structure including a coupling enhancement component for improving electromagnetic coupling coefficient provided by an embodiment of the present disclosure.

Based on this, in order to achieve enhancement of the electromagnetic coupling coefficient, optionally, as shown in FIG. 6, the coupling enhancement component 130 may include at least one coupling connecting piece 131.

In detail, each of coupling connecting pieces 131 is connected to two resonance columns 121 respectively, so as to improve the electromagnetic coupling coefficient between the two resonance columns 121. That is to say, one coupling connecting piece 131 may be directly electrically connected to the two resonance columns 121 respectively, so that electromagnetic coupling is formed between the two resonance columns 121.

Optionally, the relative relationship between the two resonance columns 121 connected with one of coupling connecting pieces 131 is not limited, and can be selected according to actual application requirements, as long as there are two resonance columns 121.

For example, in an optional example, if only the overall frequency value of the passband of the filter structure 100 needs to be increased, the following settings may be performed.

In the propagation direction of the to-be-processed signal between the resonance components 120, each of coupling connecting pieces 131 is connected to two adjacent resonance columns 121 respectively, so as to improve the electromagnetic coupling coefficient between the two adjacent resonance columns 121.

Figure 7:
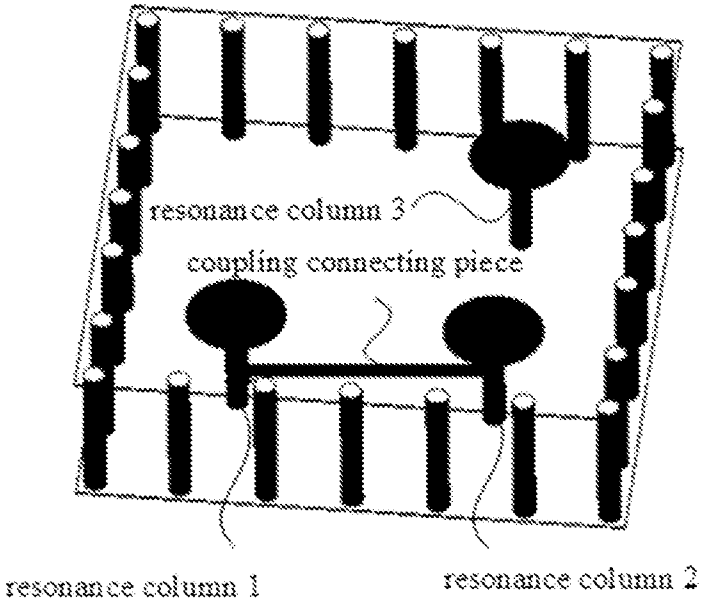
FIG. 7 is a schematic view of a connection relationship between a coupling connecting piece and two adjacent resonance columns provided by an embodiment of the present disclosure based on FIG. 6.

In detail, in a specific application example, as shown in FIG. 7, at least two resonance components are included, wherein the resonance components may include a resonance column 1, a resonance column 2 and a resonance column 3, and the transmission directions of the to-be-processed signal are the resonance column 1, the resonance column 2 and the resonance column 3 in sequence. In this way, the coupling connecting piece 131 may be electrically connected to the resonance column 1 and the resonance column 2 respectively (that is, no resonance column 121 is spaced between the resonance column 1 and the resonance column 2).

For another example, in another optional example, on the basis of the need to increase the overall frequency value of the passband of the filter structure 100, it is also necessary to perform signal suppression at a position close to an upper cut-off frequency, and the following settings can be performed.

In the propagation direction of the to-be-processed signal between the resonance components 120, in at least one coupling connecting piece 131, at least one coupling connecting piece 131 is connected to two non-adjacent resonance columns 121 respectively, so as to improve the electromagnetic coupling coefficient between the two non-adjacent resonance columns 121, and form a transmission zero at a position outside the passband of the filter structure 100 and close to the upper cut-off frequency.

Figure 8:
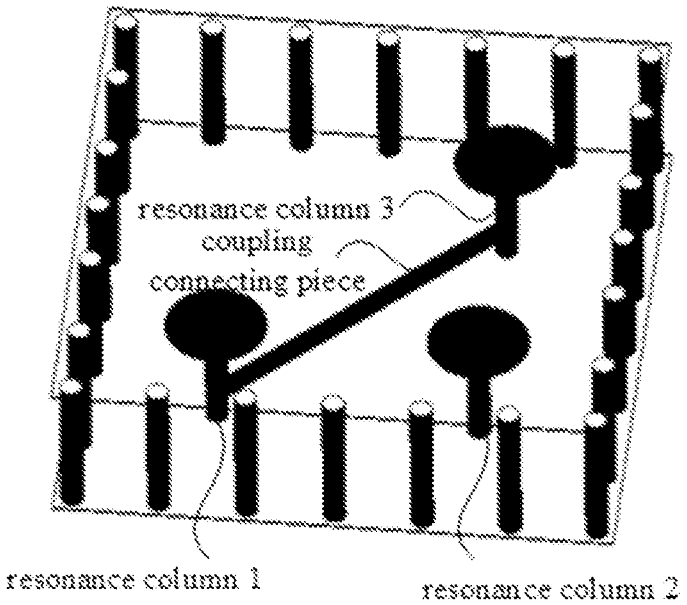
FIG. 8 is a schematic view of a connection relationship between the coupling connecting piece and two non-adjacent resonance columns provided by an embodiment of the present disclosure based on FIG. 6.

In detail, in a specific application example, as shown in FIG. 8, at least two resonance components are included, and the resonance components may include a resonance column 1, a resonance column 2 and a resonance column 3, and the transmission directions of the to-be-processed signal are resonance column 1, resonance column 2 and resonance column 3 in sequence. In this way, the coupling connecting piece 131 may be electrically connected to the resonance column 1 and the resonance column 3 respectively (that is, the resonance column 1 and the resonance column 3 are spaced by the resonance column 2).

In the above, the specific position of the transmission zero close to the upper cut-off frequency is not limited, and can be configured accordingly according to actual application requirements.

For example, in an optional example, in order to make the frequency of the transmission zero closer to the upper cut-off frequency, the distance between the coupling connecting piece 131 and the first shielding layer 111 (that is, the height of the coupling connecting piece 131) may be increased, and/or, the width of the coupling connecting piece 131 may be increased.

For another example, in another optional example, in order to make the frequency of the transmission zero more deviate from the upper cut-off frequency, the distance between the coupling connecting piece 131 and the first shielding layer 111 (the height of the coupling connecting piece 131) may be reduced, and/or the width of the coupling connecting piece 131 may be reduced.

Figure 9:
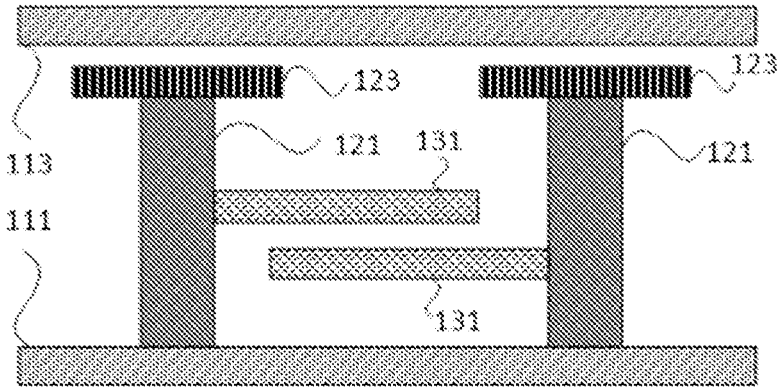
FIG. 9 is a structural schematic view of the filter structure including the coupling enhancement component for improving capacitance coupling coefficient provided by an embodiment of the present disclosure.

Based on another requirement, in order to achieve the enhancement of the capacitive coupling coefficient, in this embodiment, as shown in FIG. 9, the coupling enhancement component 130 may include at least one group of coupling connecting pieces 131, and each group of coupling connecting pieces 131 may include two coupling connecting pieces 131.

In detail, for each group of coupling connecting pieces 131, two coupling connecting pieces 131 belonging to the same group are respectively connected to two resonance columns 121, and the two coupling connecting pieces 131 are provided at an interval in a staggered manner to form a capacitive component, thereby improving the capacitive coupling coefficient between the two resonance columns 121.

That is to say, a capacitive component may be formed through the indirect electrical connection of the two coupling connecting pieces 131 of the same group, so as to improve the capacitive coupling coefficient between the two connected resonance columns 121.

Optionally, the relative relationship between the two resonance columns 121 connected by each group of coupling connecting pieces 131 is not limited, and can be selected according to actual application requirements.

For example, in an optional example, if only the overall frequency value of the passband of the filter structure 100 needs to be reduced, the following settings may be performed.

In the propagation direction of the to-be-processed signal between the resonance components 120, the two coupling connecting pieces 131 belonging to the same group are respectively connected to the two adjacent resonance columns 121, so as to improve the capacitive coupling coefficient between the two adjacent resonance columns 121.

Figure 10:
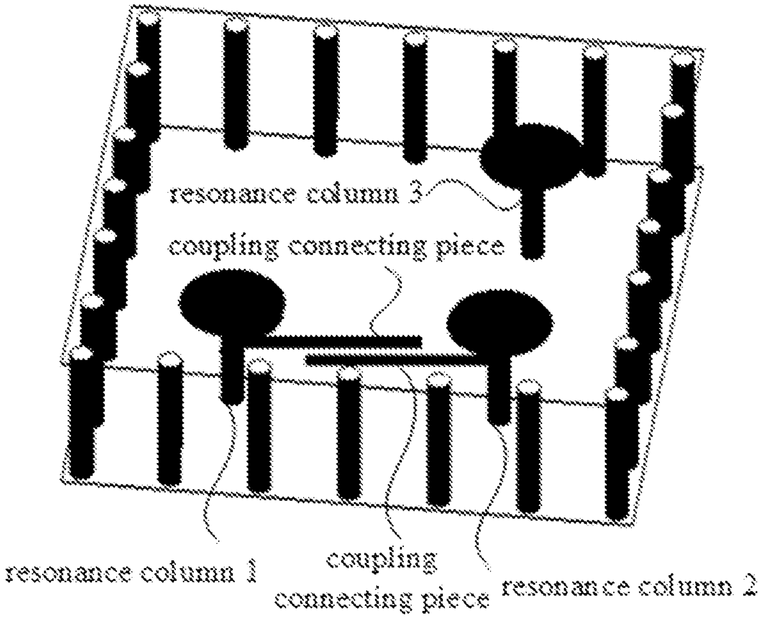
FIG. 10 is a schematic view of a connection relationship between the coupling connecting piece provided by the embodiment of the present disclosure based on FIG. 9 and two adjacent resonance columns provided by an embodiment of the present disclosure.

In detail, in a specific application example, as shown in FIG. 10, at least two resonance components are included, and the resonance components may include a resonance column 1, a resonance column 2 and a resonance column 3, and the transmission directions of the to-be-processed signal are resonance column 1, resonance column 2 and resonance column 3 in sequence. In this way, the two coupling connecting pieces 131 in a group of coupling connecting pieces 131 may be electrically connected to the resonance column 1 and the resonance column 2 respectively (that is, there is no resonance column 121 spaced between the resonance column 1 and the resonance column 2).

For another example, in another optional example, on the basis of the need to reduce the overall frequency value of the passband of the filter structure 100, it is also necessary to perform the suppression on the signal at the position close to the lower cut-off frequency, and the following settings can be performed.

In the propagation direction of the to-be-processed signal between the resonance components 120, two coupling connecting pieces 131 of at least one group of coupling connecting pieces 131 are respectively connected to two non-adjacent resonance columns 121, so as to improve the capacitive coupling coefficient between the two non-adjacent resonance columns 121, and form a transmission zero at a position outside the passband of the filter structure 100 and close to the lower cut-off frequency.

Figure 11:
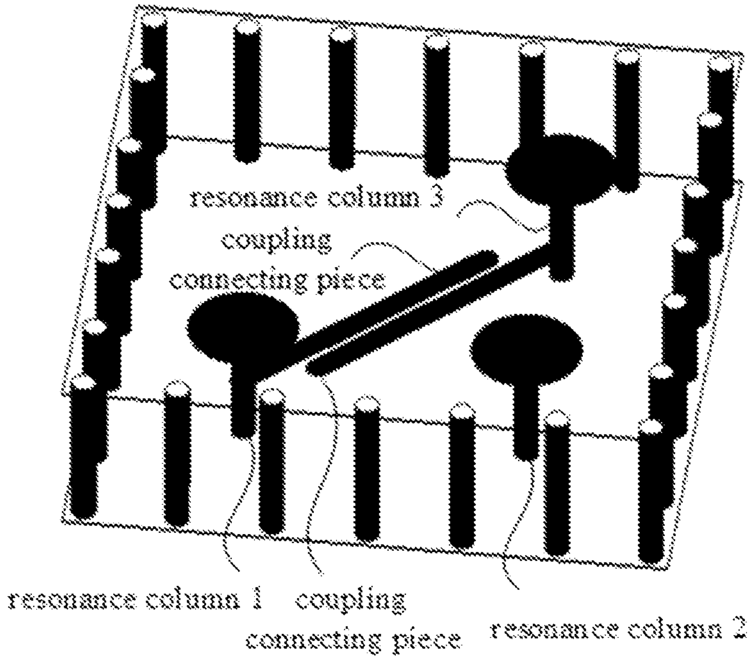
FIG. 11 is a schematic view of a connection relationship between the coupling connecting piece and two non-adjacent resonance columns provided by an embodiment of the present disclosure based on FIG. 9.

In detail, in a specific application example, as shown in FIG. 11, at least two resonance components are included, and the resonance components may include a resonance column 1, a resonance column 2 and a resonance column 3, and the transmission directions of the to-be-processed signal are resonance column 1, resonance column 2 and resonance column 3 in sequence. In this way, two coupling connecting pieces 131 in a group of coupling connecting pieces 131 can be electrically connected to the resonance column 1 and the resonance column 3 respectively (that is, the resonance column 1 and the resonance column 3 are spaced by the resonance column 2).

In the above, the specific position of the transmission zero close to the lower cut-off frequency is not limited, and can be configured accordingly according to actual application requirements.

For example, in an optional example, in order to make the frequency at the position of the transmission zero closer to the lower cut-off frequency, the distance between the two coupling connecting pieces 131 and the first shielding layer 111 (that is, the height of the two coupling connecting pieces 131) may be increased, and/or the staggered area of the two coupling connecting pieces 131 (that is, the directly facing area of the formed capacitive component) may be increased.

For another example, in another optional example, in order to make the frequency at the position of the transmission zero more deviate from the lower cut-off frequency, the distance between the two coupling connecting pieces 131 and the first shielding layer 111 (that is, the height of the two coupling connecting pieces 131) may be reduced, and/or the staggered area of the two coupling connecting pieces 131 (that is, the directly facing area of the formed capacitive component) may be reduced.

It can be understood that the relative positional relationship between the two coupling connecting pieces 131 belonging to the same group of coupling connecting pieces 131 is also not limited, and can be selected according to actual application requirements.

For example, in an optional example, two coupling connecting pieces 131 belonging to the same group of coupling connecting pieces 131 may be provided in non-parallel with each other, for example, may have a smaller included angle.

For another example, in another optional example, two coupling connecting pieces 131 belonging to the same group of coupling connecting pieces 131 may be provided in parallel with each other, and projections of staggered parts of the two coupling connecting pieces 131 in a direction perpendicular to extension direction of the two coupling connecting pieces 131 are coincided.

In this way, it can be ensured that the two coupling connecting pieces 131 belonging to the same group of coupling connecting pieces 131 have a larger directly facing area, so as to increase the capacitance value of the formed capacitive component, thereby increasing the capacitive coupling coefficient between the two connected resonance columns 121.

It should be further noted for the coupling enhancement component 130 that the specific structure of the coupling enhancement component 130 is also not limited, and can be selected according to actual application requirements.

For example, in an optional example, the coupling enhancement component 130 may be a metal structure (e.g., the above-mentioned coupling connecting piece 131 may be a metal connecting wire). For another example, in another optional example, the coupling enhancement component 130 may also be a non-metal conductive structure.

Based on the above-mentioned examples, the coupling coefficient between the resonance columns 121 can be increased, thereby increasing the bandwidth of the passband of the filter structure 100. In addition, in order to fully explain the effect of increasing the bandwidth of the passband, based on the filter structure 100 in the above-mentioned example, the present disclosure performs simulation analysis on the filter structure 100 and the existing filter structure respectively.

Figure 12:
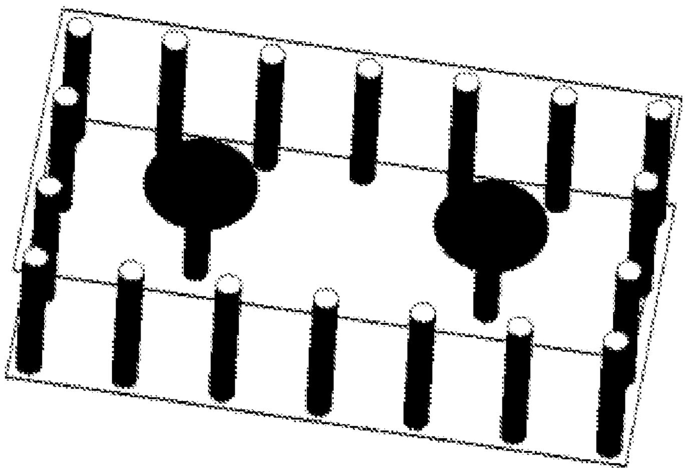
FIG. 12 is a structural schematic view of an existing filter structure.

For the existing filter structure 100 that does not include the coupling enhancement component 130, one comparative example is provided, as shown in FIG. 12, the filter structure 100 may include two resonance columns 121.

Figure 13:
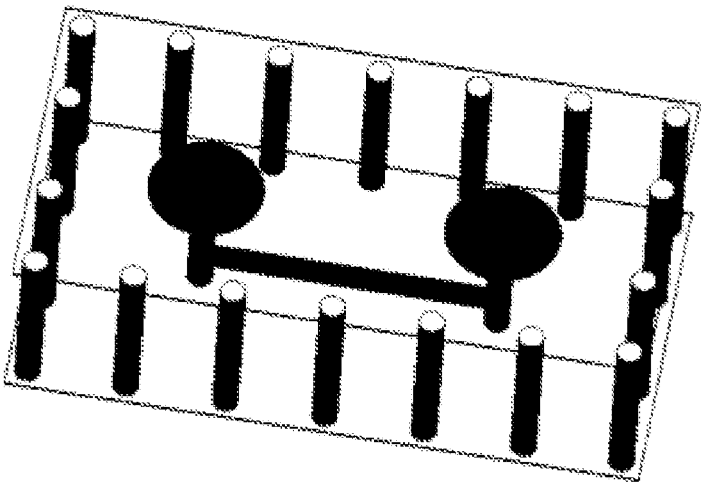
FIG. 13 a structural schematic view of the filter structure including the coupling connecting piece for improving electromagnetic coupling coefficient provided by an embodiment of the present disclosure.
Figure 14:
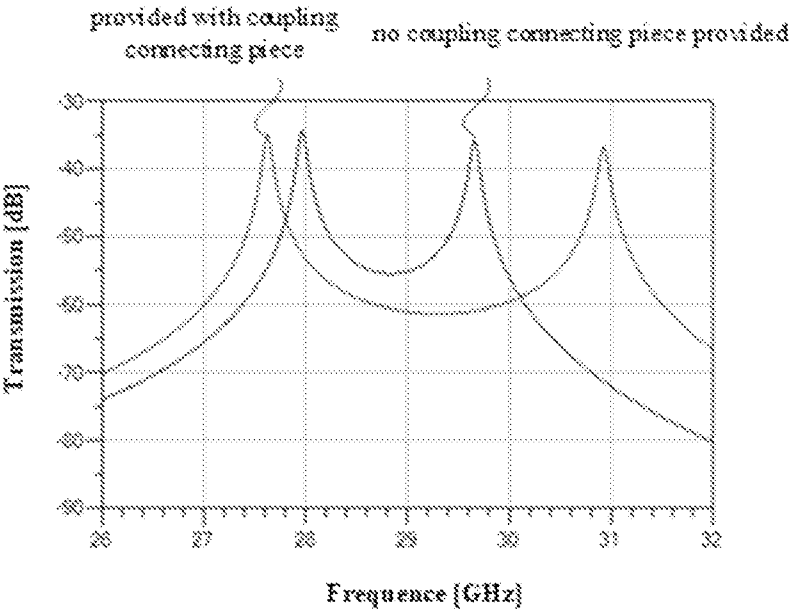
FIG. 14 is a schematic view of simulation results based on two filter structures shown in FIG. 12 and FIG. 13.

Here, an experimental example of a filter structure 100 capable of improving the electromagnetic coupling coefficient is provided as shown in FIG. 13, the filter structure 100 includes two resonance columns 121 and one coupling connecting piece 131, and the two resonance columns 121 are electrically connected through the coupling connecting piece 131 to achieve the electromagnetic coupling. In this way, the filter structure 100 and the aforementioned existing filter structure are performed by simulation analysis, the simulation results shown in FIG. 14 can be obtained, wherein the distance between the two peaks can represent the bandwidth of the passband of the filter structure, obviously, it can be known that the filter structure 100 provided with the coupling connecting piece 131 has a larger bandwidth of the passband than the filter structure without the coupling connecting piece 131.

Figure 15:
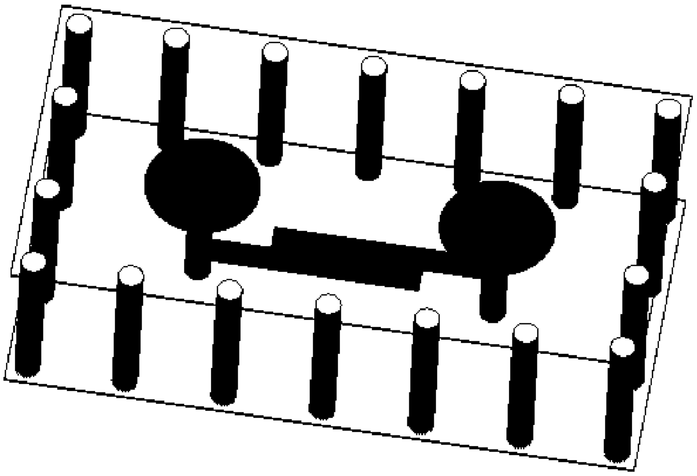
FIG. 15 is a structural schematic view of the filter structure including the coupling connecting piece for improving capacitance coupling coefficient provided by an embodiment of the present disclosure.
Figure 16:
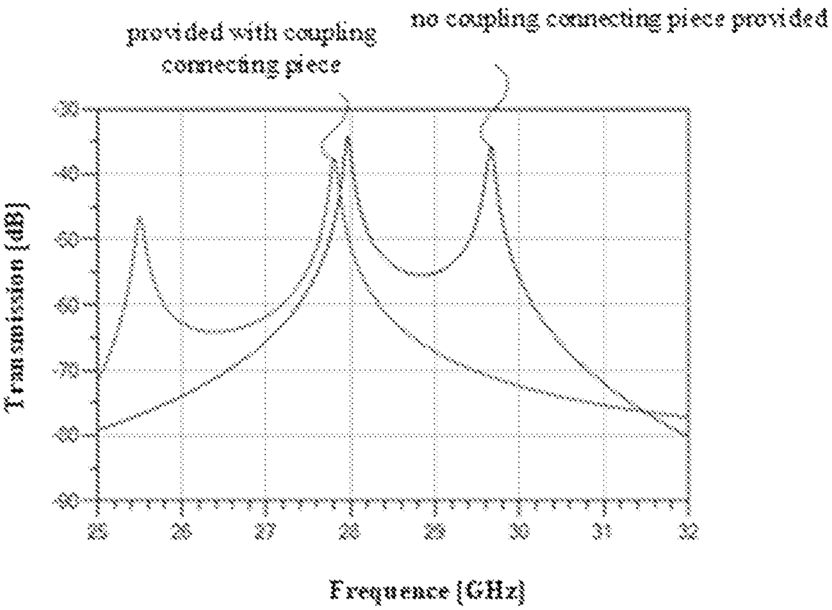
FIG. 16 is a schematic view of simulation results based on two filter structures shown in FIG. 12 and FIG. 15.

Here, an experimental example of a filter structure 100 capable of improving the capacitive coupling coefficient is provided as shown in FIG. 15, the filter structure 100 includes two resonance columns 121 and one group of coupling connecting pieces 131, and the two resonance columns 121 are electrically connected with two coupling connecting pieces 131 in the group of coupling connecting pieces 131 respectively to achieve the capacitive coupling. In this way, the filter structure 100 and the aforementioned existing filter structure are performed by simulation analysis, the simulation results shown in FIG. 16 can be obtained, wherein the distance between the two peaks can represent the bandwidth of the passband of the filter structure, obviously, it can be known that the filter structure 100 provided with the coupling connecting piece 131 has a larger bandwidth of the passband than the filter structure without the coupling connecting piece 131.

In addition, the inventor of the present disclosure found in the research process that if the coupling enhancement component 130 is grounded, the coupling coefficient between the resonance columns 121 cannot be effectively improved, so that the bandwidth of the passband cannot be effectively widened.

Figure 17:
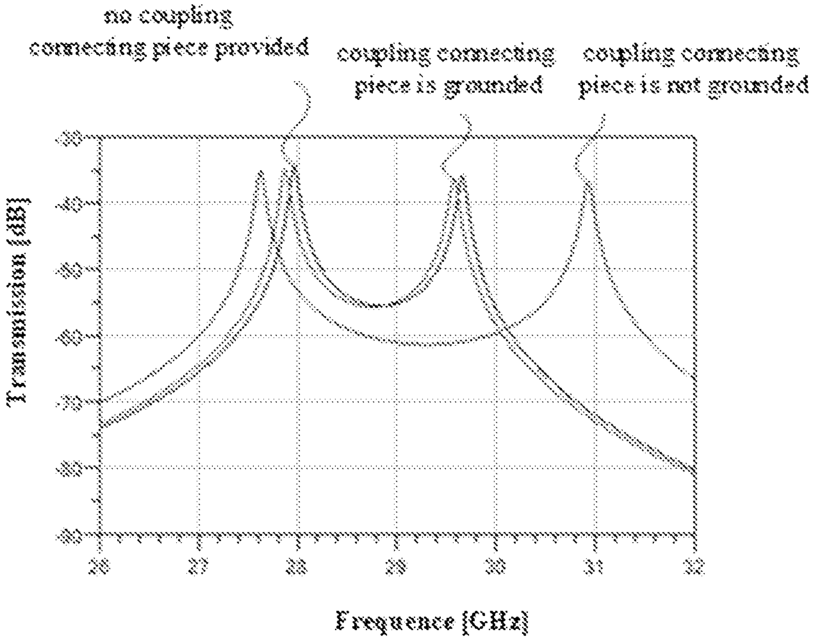
FIG. 17 is a schematic view of a simulation based on three filter structures shown in FIG. 12, FIG. 13 and FIG. 15.

Similarly, in order to illustrate whether the grounding arrangement of the coupling enhancement component 130 will produce different effects, corresponding simulation analysis is also performed in the present disclosure, as shown in FIG. 17, it respectively shows a simulation schematic view of the comparative example of FIG. 12, the experimental example in FIG. 13 and another experimental example in which the coupling connecting piece 131 and the first shielding layer 111 are arranged in a contacting manner in this experimental example. Obviously, it can be known that the filter structure 100 in which the coupling connecting piece 131 is not grounded has a larger bandwidth of the passband than the filter structure in which the coupling connecting piece 131 is grounded.

To sum up, the filter structure 100 and the filter device 10 provided by the present disclosure are provided with the coupling enhancement component 130 on the basis of providing with the shielding component 110 and the resonance component 120, so as to perform enhancement processing on the coupling coefficient between the resonance columns 121 of the at least two resonance components 120. In this way, on the one hand, the arrangement of the coupling enhancement component 130 will not lead to an increase in the volume of the filter structure 100; on the other hand, due to the arrangement of the coupling enhancement component 130, the coupling coefficient between the connected resonance columns 121 can also be improved, so as to increase the bandwidth of the passband of the filter structure 100, thereby solving the problem of how to simultaneously achieve integration and effectively widen the bandwidth of the passband of a device, which has higher practical value, and has a better application effect especially in the application of precise instruments.

The above descriptions are only preferred embodiments of the present disclosure, and are not intended to limit the present disclosure. For those skilled in the art, the present disclosure may have various modifications and changes. Any modification, equivalent replacement, improvement, etc. made within the spirit and principle of the present disclosure shall be included within the protection scope of the present disclosure.

INDUSTRIAL APPLICABILITY

A filter structure and a filter device provided by the present disclosure are provided with a coupling enhancement component, on the basis of providing with the shielding component and the resonance component, so as to perform enhancement processing on the coupling coefficient between the resonance columns of the at least two resonance components. In this way, the problem of how to simultaneously achieve integration and effectively widen the bandwidth of the passband of a device can be solved in the filter device, which has higher practical value.

What is claimed is:

1. A filter structure, comprising:

a shielding component, wherein the shielding component comprises a first shielding layer and a second shielding layer, and the first shielding layer and the second shielding layer are provided opposite to each other at an interval;

at least two resonance components, wherein the at least two resonance components are provided at an interval, each of the resonance components comprises a resonance column and a resonance disk connected to the resonance column, and the resonance column is located between the first shielding layer and the second shielding layer and is connected to the first shielding layer; and a coupling enhancement component, wherein the coupling enhancement component is respectively spaced apart from the first shielding layer and the second shielding layer, and is respectively connected to at least two resonance columns, so as to increase a coupling coefficient between the at least two resonance columns, wherein the coupling enhancement component comprises at least one group of coupling connecting pieces, and each group of coupling connecting pieces comprises two coupling connecting pieces, wherein in a propagation direction of a to-be-processed signal between the resonance components, the two coupling connecting pieces belonging to the same group are respectively connected to two adjacent resonance columns, and the two coupling connecting pieces are provided at an interval in a staggered manner to form a capacitive component, so as to improve a capacitive coupling coefficient between the two adjacent resonance columns.

2. The filter structure according to claim 1, wherein two coupling connecting pieces belonging to a same group are provided in parallel, and projections of staggered parts of the two coupling connecting pieces in a direction perpendicular to an extension direction of the two coupling connecting pieces are coincided.

3. The filter structure according to claim 1, wherein the coupling enhancement component is in a metal structure.

4. The filter structure according to claim 1, wherein the first shielding layer and the second shielding layer are patterned conductive structures formed on other non-conductive structures.

5. The filter structure according to claim 1, wherein the shielding component further comprises a plurality of shielding columns, and the plurality of shielding columns are provided at intervals between the first shielding layer and the second shielding layer, so as to form a cavity structure, and the resonance components and the coupling enhancement component are located inside the cavity structure.

6. The filter structure according to claim 5, wherein a plurality of cavity sub-structures are formed inside the cavity structure, so as to respectively arrange the resonance components, and a shielding opening for transmitting a to-be-processed signal between the resonance components is formed between the cavity sub-structures.

7. The filter structure according to claim 1, wherein the shielding component further comprises a plurality of other shielding layers provided between the first shielding layer and the second shielding layer and forming a closed cavity structure together with the first shielding layer and the second shielding layer, and the resonance components and the coupling enhancement component are located inside the cavity structure.

8. The filter structure according to claim 7, wherein opposite surfaces of the first shielding layer and the second shielding layer are quadrilaterals, and the plurality of other shielding layers comprises four of the other shielding layers.

9. The filter structure according to claim 7, wherein a plurality of cavity sub-structures are formed inside the cavity structure, so as to respectively arrange the resonance components, and a shielding opening for transmitting a to-be-processed signal between the resonance components is formed between the cavity sub-structures.

10. A filter device, comprising:

a connection port, wherein the connection port comprises a first port and a second port; and wherein a plurality of the filter structures of claim 1 are provided, and the plurality of filter structures are respectively connected between the first port and the second port, so as to perform filtering processing on a to-be-processed signal input through the first port and then output through the second port, or perform filtering processing on a to-be-processed signal input through the second port and then output through the first port.

* * * * *